July 31, 1956     J. HEDU     2,756,909

SALT SHAKER

Filed Feb. 27, 1953

INVENTOR

Jon Hedu

BY Rockwell & Bartholow

ATTORNEYS

United States Patent Office 2,756,909
Patented July 31, 1956

2,756,909
SALT SHAKER

Jon Hedu, Watertown, Conn., assignor to The Watertown Manufacturing Company, Watertown, Conn., a corporation of Connecticut Application February 27, 1953, Serial No. 339,243

3 Claims. (Cl. 222—459)

This invention relates to salt shakers and contemplates improvements therein by which salt shakers, especially those formed of plastic material, may be provided with effective means to break up lumps of salt which form in salt shakers from time to time, owing to exposure of the contents to moisture-laden air.

Accordingly, one object of the invention is to provide a salt shaker having effective means to break up lumps of salt contained in the shaker.

Another object of the invention is to provide a salt shaker, as characterized above, which may be conveniently formed of plastic material.

Further objects of the invention will appear hereinafter as the preferred embodiment of the invention is described in detail.

Figure 1:
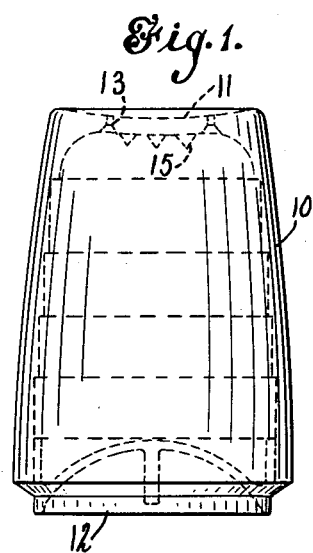
Fig. 1 is an elevational view of a salt shaker embodying the invention.
Figure 4:
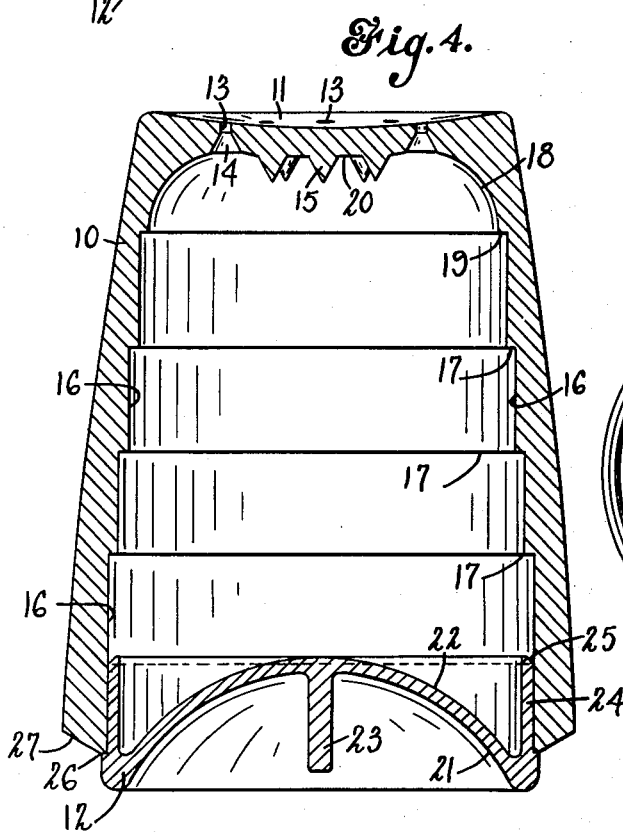
Fig. 4 is an enlarged longitudinal sectional view of the shaker.
Figure 5:
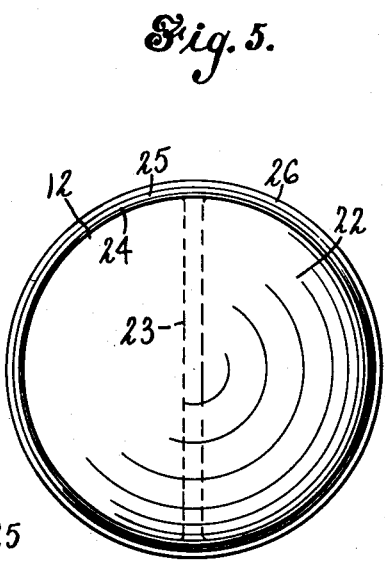
Fig. 5 is an enlarged top plan view of the closure member for the shaker illustrated in Figs. 1, 3 and 4.

In the drawing, the numeral 10 indicates generally the hollow body of a salt shaker which may take substantially the form of an upwardly directed cone segment, as illustrated in Fig. 1 of the drawing, for example, having a top which is preferably integral with the body and which is preferably dished to a slight extent, as indicated at 11. The body 10 is provided with an opening in the bottom thereof, the opening being equivalent in size to the largest internal diameter of the body 10 and the opening being closed by a removable closure member 12 extending into the body 10 and having a pressure fit with the interior thereof, as illustrated in Fig. 4 of the drawing. The body 10 is preferably formed of plastic material, and the closure member 12 is preferably formed of plastic material which is softer than the material of the body 10 so that the closure member 12 may have sufficient resiliency to facilitate the pressure fit of the closure member 12 with the body 10. For example, the body may be formed of melamine and the closure member 12 may be formed of polyethylene. The structure of the closure member 12 will be more fully described hereinafter.

Figure 2:
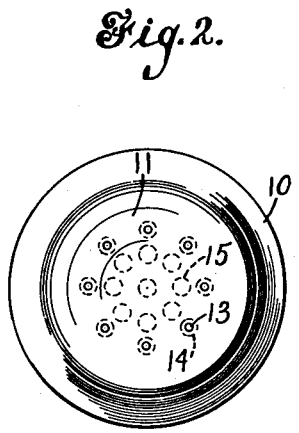
Fig. 2 is a top plan view of the shaker.
Figure 3:
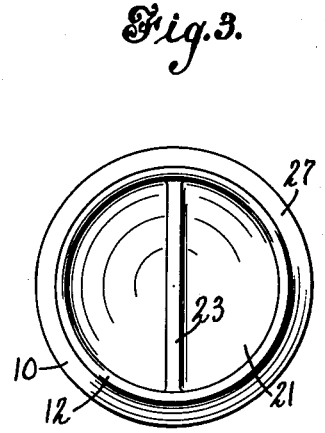
Fig. 3 is a bottom plan of the shaker.

The hollow body 10 of the salt shaker provides a container for salt and the top of the body is provided with a series of salt-dispensing openings 13 preferably arranged concentrically of the top, as illustrated in Fig. 2 of the drawing. Each of the dispensing openings 13 may be flared at the inner end thereof, as indicated at 14, so that any salt clogging the openings may be easily dislodged and returned to the store of salt in the shaker as by jarring the latter. As illustrated in Figs. 1, 2 and 4 of the drawing, a series of depending cone-shaped projections 15 is formed integrally with the top of the salt shaker inwardly of the series of dispensing openings 13 formed in the top. One of the projections 15 being located concentrically of the top of the salt shaker and each of the remaining projections being located adjacent one of the dispensing openings 13 on the same diameter therewith, as indicated in Fig. 2 of the drawing. In the form of the invention illustrated in the drawing, the top of the salt shaker is provided with eight dispensing openings 13 and nine depending cone-shaped projections 15. However, it will be understood that the number of dispensing openings 13 and depending cone-shaped projections 15 may be varied within the above-described relative arrangement of the dispensing openings 13 and the cone-shaped projections 15. The depending cone-shaped projections 15 formed on the top of the salt shaker tend to break up any lumps of salt located in the bottom of the shaker adjacent the center thereof and moving toward the dispensing end of the shaker during the dispensing of salt therefrom. It will be understood that salt may be dispensed from the shaker by inverting the shaker and shaking the latter endwise.

The body of the salt shaker is provided with an interior side wall structure which tends to break up any lumps of salt located adjacent the side wall structure in the bottom of the shaker and moving toward the dispensing end thereof during the dispensing of salt from the shaker. For this purpose, the body 10 of the shaker is provided with an interior wall structure comprising a plurality of stepped cylindrical side wall surfaces 16, becoming progressively and rather sharply smaller in diameter toward the top of the shaker, the wall surfaces 16 having substantially right angular edge portions 17 therebetween presenting a series of sharp annular projections converging toward the dispensing end of the shaker. Above the uppermost cylindrical wall surface 16, the body 10 is provided with an inner concave surface 18 leading to the dispensing openings 13 formed in the top of the shaker. The dispensing openings 13 extend through the inner concave surface 18. An annular shoulder 19 is provided between the concave surface 18 and the last-mentioned cylindrical wall surface 16, the shoulder 19 meeting the concave surface 18 in a sharp edge. Thus in accordance with the invention, any lumps of salt in the bottom of the shaker adjacent the side wall structure thereof tend to strike and break up against the sharp annular projections of the side wall structure when and as the lumps move toward the dispensing end of the shaker during the dispensing of salt from the shaker. As illustrated in Fig. 4 of the drawing, for example, the cone-shaped projections 15 formed on the top of the shaker for breaking up lumps of salt depend from a slightly convex surface 20 arranged concentrically of the concave surface 18. Thus it will be understood that grains of salt separated from lumps striking any of the lump-breaking projections 17, 19 or 15, formed on the body, will be deflected toward the dispensing openings 13 when the shaker is inverted.

In accordance with the invention, the closure member 12 is provided with a generally concave lower surface 21 and an upper convex surface 22, the surfaces 21 and 22 being located concentrically of the bottom of the body 10 and the convex surface 22 serving to deflect salt toward the side wall structure of the body so that lumps in the salt tend to strike the side wall structure of the body 10 when the shaker is inverted. The closure member 12 may be provided with a diametrically disposed web 23 depending from the concave surface 21 thereof and adapted for manipulation, as in the insertion or removal of the closure member 12. An upwardly extending cylindrical wall 24 is provided on the closure member 12 around the convex surface 22 thereof, the upper edge of the cylindrical wall 24 being disposed in substantially the same horizontal plane as the highest point of the convex surface 22. The upper edge of the cylindrical wall 24 of the closure member may be beveled as at 25 to facilitate insertion of the closure member in the lower end of the body 10. As illustrated in Fig. 4 of the drawing, the cylindrical wall 24 of the closure member has a pressure fit with the lowermost cylindrical wall surface 16 of the body 10 forming a tight seal therewith, the last-mentioned cylindrical wall surface 16 being of greater depth than the cylindrical wall surfaces 16 disposed above it to accommodate the closure member 12 in the manner illustrated in the drawing. The closure member 12 may depend a short distance from the lower end of the body 10 and may be provided with an annular shoulder 26 engaging the lower edge of the body 10, as illustrated in Fig. 4 of the drawing. The lower edge of the body 10 may be beveled, as indicated at 27.

In accordance with the invention, a salt shaker may be provided with cooperating interior lower, upper, and side wall formations which provide very effective means for breaking up any lumps of salt in the shaker when and as salt is dispensed from the shaker. The salt shaker is pleasing in appearance and is comprised of a minimum number of separable parts. Still further, the design of the shaker is peculiarly well adapted to be carried out in plastic material and the shaker may be produced at low cost.

The salt shaker is susceptible of various modifications without departure from the principles of the invention and the scope of the claims. For example, the closure member may have a threaded connection to the body of the shaker instead of a pressure fit between the closure member and the body.

What I claim is:

1. A salt shaker comprising a hollow body providing a container for salt, said body being provided with a top and closure means at the lower end thereof, said top being provided with an inner annular concave surface and an inner convex surface inwardly and concentrically of said concave surface and adjacent thereto, said top having a series of dispensing apertures arranged concentrically of said concave surface and extending through the latter, and said top having a series of integral projections depending from the convex surface thereof and adapted to break up lumps of salt, one of said projections being arranged concentrically of said annular concave surface and each of the remaining projections being arranged adjacent one of said dispensing apertures on a plane coincident with the latter and said concentrically arranged projection.

2. A salt shaker comprising a hollow body providing a container for salt, said body being provided with a top and closure means at the lower end thereof, said body having an inner side-wall structure comprising an upwardly extending series of transversely arranged projections converging toward said top and tending to break up lumps of salt moving toward said top when the shaker is inverted, said closure means comprising a part having an inner convex surface tending to deflect salt from the central region of the body toward the lump-breaking sidewall structure, said top being provided with an inner annular concave surface and an inner convex surface inwardly and concentrically of said concave surface and adjacent thereto, said top having a series of dispensing apertures extending through the top in the region of the annular concave surface thereof, and said top having a series of projections depending from the convex surface thereof tending to break up any lumps of salt moving toward said convex surface of the top when the shaker is inverted, said convex surface of the top tending to deflect salt toward said dispensing apertures extending through said annular concave surface of the top.

3. A salt shaker comprising a hollow body providing a container for salt, said body being provided with an integral top and having an inner side-wall structure comprising an upwardly extending series of transversely arranged projections converging toward said top and tending to break up lumps of salt moving toward said top when the shaker is inverted, and separable closure means at the lower end of said body and comprising a part having an inner convex surface tending to deflect salt from the central region of the container toward the lump-breaking side-wall structure, said top being provided with an inner annular concave surface and an inner convex surface inwardly and concentrically of said concave surface and adjacent thereto, said top having a series of dispensing apertures extending through the top in the region of the annular concave surface thereof and being flared at their lower ends, and said top having a series of projections depending from the convex surface thereof tending to break up any lumps of salt moving toward said convex surface of the top when the shaker is inverted, said convex surface of the top tending to deflect salt toward said dispensing apertures extending through said annular concave surface of the top.

References Cited in the file of this patent

UNITED STATES PATENTS

| | | |
|---|---|---|
| 207,434 | Morgan | Aug. 27, 1878 |
| 915,742 | Commings | Mar. 23, 1909 |
| 1,868,277 | Degner | July 19, 1932 |
| 2,028,870 | Jennings | Jan. 28, 1936 |
| 2,125,629 | Gallo | Aug. 2, 1938 |
| 2,545,240 | Patoe | Mar. 13, 1951 |
| 2,656,075 | Clark | Oct. 20, 1953 |